(12) United States Patent
Kasahara

(10) Patent No.: US 10,604,145 B2
(45) Date of Patent: Mar. 31, 2020

(54) HYBRID VEHICLE DRIVE SYSTEM

(71) Applicant: Honda Motor Co., Ltd., Tokyo (JP)

(72) Inventor: Takahiro Kasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/353,943

(22) Filed: Mar. 14, 2019

(65) Prior Publication Data

US 2019/0291716 A1 Sep. 26, 2019

(30) Foreign Application Priority Data

Mar. 23, 2018 (JP) .................. 2018-055599

(51) Int. Cl.
*B60W 20/20* (2016.01)
*B60K 6/442* (2007.10)
*B60K 6/365* (2007.10)
*B60K 6/387* (2007.10)
*B60K 6/383* (2007.10)
*B60W 10/30* (2006.01)
*B60W 10/02* (2006.01)

(52) U.S. Cl.
CPC ............ *B60W 20/20* (2013.01); *B60K 6/365* (2013.01); *B60K 6/383* (2013.01); *B60K 6/387* (2013.01); *B60K 6/442* (2013.01); *B60W 10/02* (2013.01); *B60W 10/30* (2013.01); *B60W 2510/0638* (2013.01); *B60W 2710/021* (2013.01); *B60W 2710/305* (2013.01); *B60Y 2200/92* (2013.01); *B60Y 2300/18125* (2013.01)

(58) Field of Classification Search
CPC ...... B60W 20/20; B60W 10/02; B60W 10/30; B60W 2710/305; B60W 2510/0638; B60W 2710/021; B60K 6/383; B60K 6/387; B60K 6/365; B60K 6/442; B60K 6/445; B60K 2006/81; B60Y 2300/18125; B60Y 2200/92

See application file for complete search history.

(56) References Cited

U.S. PATENT DOCUMENTS

2012/0323425 A1* 12/2012 Suyama ................. B60K 6/387
701/22
2013/0030624 A1* 1/2013 Suyama ................. B60K 6/387
701/22

(Continued)

FOREIGN PATENT DOCUMENTS

JP 2017071321 A 4/2017

*Primary Examiner* — Russell Frejd
(74) *Attorney, Agent, or Firm* — Duft & Bornsen, PC

(57) ABSTRACT

A drive system of a hybrid vehicle including an internal combustion engine, a first and second motor-generators, a mode change mechanism, a valve unit, an oil pump driven by electric power, and a microprocessor. The microprocessor is configured to control the valve unit and driving electric power for the oil pump in drive mode including the EV mode and not including the HV mode, so as to stop to supply the hydraulic oil to the mode change mechanism and drive the oil pump by a first driving electric power when first travel mode is selected, while so as to supply the hydraulic oil of a hydraulic pressure lower than the predetermined hydraulic pressure to the mode change mechanism and drive the oil pump by a second driving electric power greater than the first driving electric power when second travel mode is selected.

8 Claims, 11 Drawing Sheets

(56) References Cited

U.S. PATENT DOCUMENTS

| | | | |
|---|---|---|---|
| 2018/0065622 A1* | 3/2018 | Nishimine | B60K 6/445 |
| 2018/0065643 A1* | 3/2018 | Nishimine | B60W 20/15 |
| 2018/0194355 A1* | 7/2018 | Tsuda | B60K 6/48 |
| 2018/0208047 A1* | 7/2018 | Ishida | B60W 20/15 |
| 2019/0291565 A1* | 9/2019 | Kasahara | B60K 20/02 |

* cited by examiner

|  |  | BR | CL | OWY | ENG |
|---|---|---|---|---|---|
| EV MODE |  | × | × | × | × |
| W MOTOR MODE |  | × | ○ | ○ | × |
| SERIES MODE |  | ○ | ○ | × | ○ |
| HV MODE | LOW | × | ○ | ○ | ○ |
|  | HIGH | ○ | × | ○ | ○ |
| REGENERATION MODE |  | × | × | × | × |

EV MODE

W MOTOR MODE

SERIES MODE

HV LOW MODE

HV HIGH MODE

REGENERATION MODE

FIG. 12

| SELECT SWITCH | DRIVE MODE | CL | BR | EOP |
|---|---|---|---|---|
| ECO MODE | EV OR REGENERATION (Ne ≦ Nα) | × | × | MINIMAL DRIVING |
| | EV OR REGENERATION (Ne > Nα) | × | × | STOP |
| | HV HIGH | × | ○ | STOP |
| NORMAL MODE | EV OR REGENERATION (Ne ≦ Nβ) | △ | △ | MEDIUM DRIVING |
| | EV OR REGENERATION (Ne > Nβ) | △ | △ | MINIMAL DRIVING |
| | HV HIGH | × | ○ | MINIMAL DRIVING |

HYBRID VEHICLE DRIVE SYSTEM

CROSS-REFERENCE TO RELATED APPLICATION

This application is based upon and claims the benefit of priority from Japanese Patent Application No. 2018-055599 filed on Mar. 23, 2018, the content of which is incorporated herein by reference.

BACKGROUND OF THE INVENTION

Field of the Invention

This invention relates to a drive system of a hybrid vehicle.

Description of the Related Art

Conventionally, there is a known apparatus of this type that includes a mechanical oil pump driven by an engine and an electrical oil pump driven by an electric motor, wherein the electrically powered oil pump (electrical oil pump) operates during engine stopped periods and operation of the electrical oil pump is stopped after engine starting. Such an apparatus is described, for example, in Japanese Unexamined Patent Publication No. 2017-071321 (JP2017-071321A). In the apparatus described in JP2017-071321A, the electrical oil pump is not indiscriminately operated when the engine is stopped but is operated when a lubricating oil deficiency is predicted to occur in a power transmission apparatus.

A point that should be considered in this connection is that hybrid vehicle drivers include some who prefer to give higher priority to fuel economy and some who prefer to give higher priority to power performance, so that drivers are preferably given the option of switching to preferred travel performance mode. And when this option is offered, operation of the electrical oil pump is preferably matched to the selected travel performance mode, but the apparatus described in JP2017-071321A completely ignores this point.

SUMMARY OF THE INVENTION

An aspect of the present invention is a drive system of a hybrid vehicle including: an internal combustion engine; a first motor-generator; a first power transmission path and a second power transmission path connected with each other in series; a power division mechanism connected to the internal combustion engine to divide a power generated by the internal combustion engine to the first motor-generator and the first power transmission path; a second motor-generator connected to the second power transmission path; a mode change mechanism provided in the first power transmission path so as to switch a drive mode to one of a plurality of drive modes including an EV mode in which the hybrid vehicle is driven by a power of the second motor-generator with the internal combustion engine stopped and a HV mode in which the hybrid vehicle is driven by the power of the second motor-generator and the power generated by the internal combustion engine; a hydraulic pressure source including a first oil pump connected to the internal combustion engine to be driven by the internal combustion engine and a second oil pump driven by a driving electric power; a valve unit configured to control a flow of a hydraulic oil supplied from the hydraulic pressure source to the mode change mechanism; a selecting portion configured to select a first travel mode prioritizing a fuel economy performance or a second travel mode prioritizing a power performance; and an electronic control unit including a microprocessor and a memory and configured to perform controlling the valve unit and the driving electric power for the second oil pump, in accordance with an operation of the selecting portion. The mode change mechanism is configured so that the drive mode is switched to the HV mode by the hydraulic oil of a predetermined hydraulic pressure supplied from the hydraulic pressure source. The microprocessor is configured to perform the controlling including controlling the valve unit and the driving electric power in a predetermined drive mode including the EV mode and not including the HV mode, so as to stop to supply the hydraulic oil to the mode change mechanism and drive the second oil pump by a first driving electric power when the first travel mode is selected by the selecting portion, while so as to supply the hydraulic oil of a hydraulic pressure lower than the predetermined hydraulic pressure to the mode change mechanism and drive the second oil pump by a second driving electric power greater than the first driving electric power when the second travel mode is selected by the selecting portion.

BRIEF DESCRIPTION OF THE DRAWINGS

The objects, features, and advantages of the present invention will become clearer from the following description of embodiments in relation to the attached drawings, in which:

FIG. 12 is a diagram showing an example of an operation of the drive system of the hybrid vehicle according to the embodiment of the invention.

DETAILED DESCRIPTION OF THE INVENTION

Figure 1:
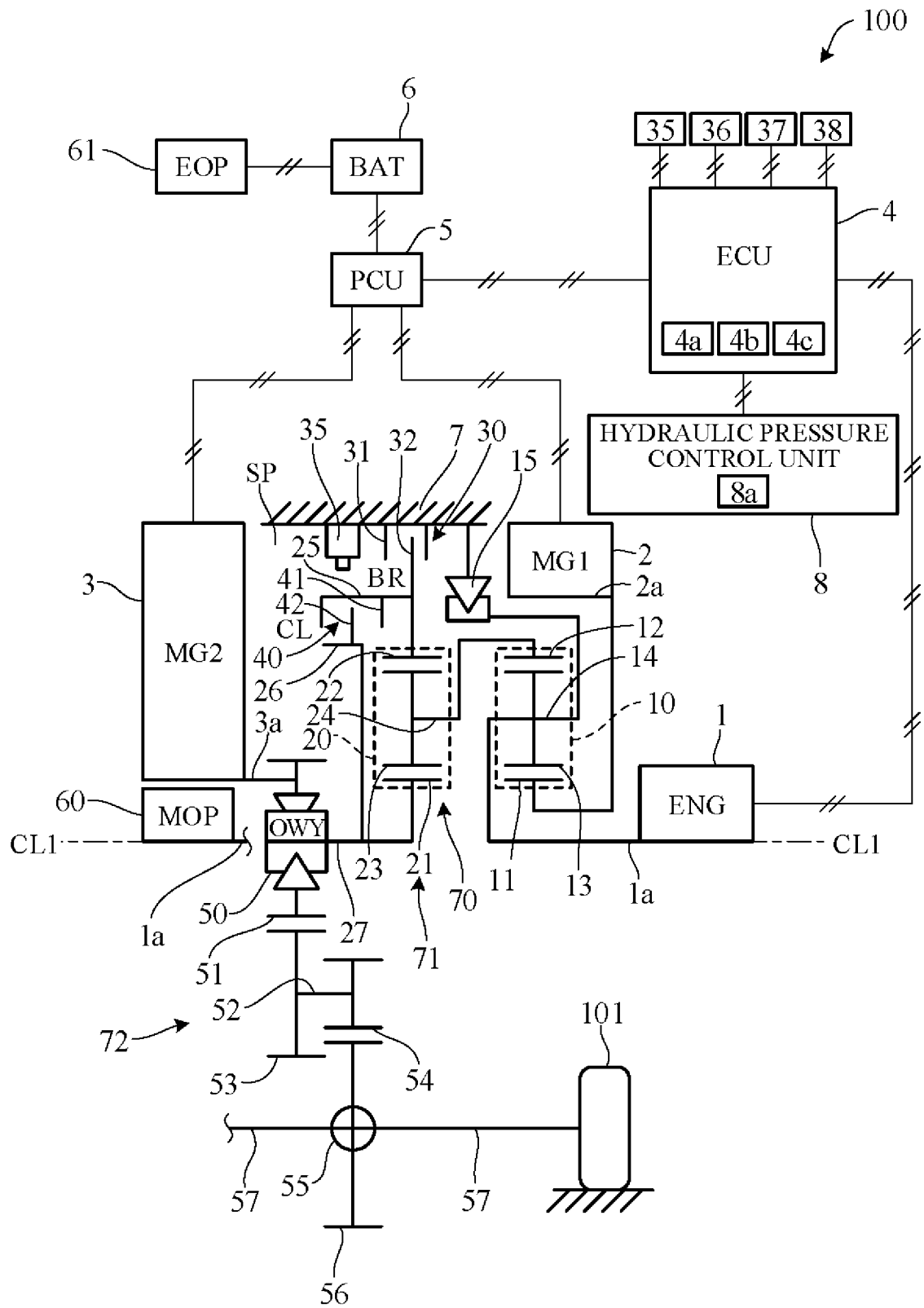
FIG. 1 is a diagram showing schematically a configuration overview of a drive system of a hybrid vehicle according to an embodiment of the invention.

Hereinafter, an embodiment of the present invention is explained with reference to FIGS. 1 to 12. A drive system according to an embodiment of the present invention is applied to a hybrid vehicle including an engine and a motor-generator as a drive power source. FIG. 1 is a diagram showing schematically a configuration overview of a drive system 100 according to the present embodiment.

As shown in FIG. 1, the drive system (drive unit) 100 includes an engine (ENG) 1, first and second motor-generators (MG1 and MG2) 2 and 3, a first planetary gear mechanism 10 for dividing motive power, and a second planetary gear mechanism 20 for changing speed ratio. The drive system 100 is mounted at front of a vehicle, and motive power of the drive system 100 is transmitted to front wheels 101. The vehicle is thus structured as a front-wheel-drive (i.e., FF layout) vehicle.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Throttle valve opening, quantity of fuel injected from the injector (injection time and injection time period) and ignition time are, inter alia, controlled by a controller (ECU) 4. An output shaft 1a of the engine 1 extends centered on axis CL1.

The first and second motor-generators 2 and 3 each has a substantially cylindrical rotor centered on axis CL1 and a substantially cylindrical stator installed around the rotor and can function as a motor and as a generator. Namely, the rotors of the first and second motor-generators 2 and 3 are driven by electric power supplied from a battery 6 through a power control unit (PCU) 5 to coils of the stators. In such case, the first and second motor-generators 2 and 3 function as motors.

On the other hand, when rotating shafts 2a and 3a of rotors of the first and second motor-generators 2 and 3 are driven by external forces, the first and second motor-generators 2 and 3 generate electric power that is applied through the power control unit 5 to charge the battery 6. In such case, the first and second motor-generators 2 and 3 function as generators. During normal vehicle traveling, such as during cruising or acceleration, for example, the first motor-generator 2 functions chiefly as a generator and the second motor-generator 3 functions chiefly as a motor. The power control unit 5 incorporates an inverter controlled by instructions from the controller 4 so as to individually control output torque or regenerative torque of the first motor-generator 2 and the second motor-generator 3.

The first motor-generator 2 and the second motor-generator 3 are coaxially installed at spaced locations. The first motor-generator 2 and second motor-generator 3 are, for example, housed in a common case 7, and a space SP between them is enclosed by the case 7. Optionally, the first motor-generator 2 and second motor-generator 3 can be housed in separate cases.

The first planetary gear mechanism 10 and second planetary gear mechanism 20 of single pinion type are installed in the space SP between the first motor-generator 2 and second motor-generator 3. Specifically, the first planetary gear mechanism 10 is situated on the side of the first motor-generator 2 and the second planetary gear mechanism 20 on the side of the second motor-generator 3.

The first planetary gear mechanism 10 includes a first sun gear 11 and a first ring gear 12 installed around the first sun gear 11, both of which rotate around axis CL1, multiple circumferentially spaced first pinions (planetary gears) 13 installed between the first sun gear 11 and first ring gear 12 to mesh with these gears 11 and 12, and a first carrier 14 that supports the first pinions 13 to be individually rotatable around their own axes and collectively revolvable around axis CL1.

Similarly to the first planetary gear mechanism 10, the second planetary gear mechanism 20 includes a second sun gear 21 and a second ring gear 22 installed around the second sun gear 21, both of which rotate around axis CL1, multiple circumferentially spaced second pinions (planetary gears) 23 installed between the second sun gear 21 and second ring gear 22 to mesh with these gears 21 and 22, and a second carrier 24 that supports the second pinions 23 to be individually rotatable around their own axes and collectively revolvable around axis CL1.

The output shaft 1a of the engine 1 is connected to the first carrier 14, and power of the engine 1 is input to the first planetary gear mechanism 10 through the first carrier 14. On the other hand, when the engine 1 is started, power from the first motor-generator 2 is input to the engine 1 through the first planetary gear mechanism 10. The first carrier 14 is connected to a one-way clutch 15 provided on an inner peripheral surface of a surrounding wall of the case 7. The one-way clutch 15 allows forward rotation of the first carrier 14, i.e., rotation in same direction as that of the engine 1, and prohibits reverse rotation. Provision of the one-way clutch 15 prevents the engine 1 from being reversely rotated by reverse torque acting through the first carrier 14.

The first sun gear 11 is connected to the rotating shaft 2a of the rotor of the first motor-generator 2, and the first sun gear 11 and first motor-generator 2 (rotor) rotate integrally. The first ring gear 12 is connected to the second carrier 24, and the first ring gear 12 and second carrier 24 rotate integrally. Owing to this configuration, the first planetary gear mechanism 10 can output power received from the first carrier 14 through the first sun gear 11 to the first motor-generator 2 and output power through the first ring gear 12 to the second carrier 24 on an axle (drive shaft) 57 side. In other words, it can dividedly output power from the engine 1 to the first motor-generator 2 and the second planetary gear mechanism 20.

An axis CL1-centered substantially cylindrical outer drum 25 is provided radially outside the second ring gear 22. The second ring gear 22 is connected to and rotates integrally with the outer drum 25. A brake mechanism 30 is provided radially outward of the outer drum 25. The brake mechanism 30 is, for example, structured as a multi-plate wet brake including multiple radially extending plates (friction members) 31 arranged in axial direction and multiple radially extending disks (friction members) 32 arranged in axial direction (multiple illustration is omitted in the drawing). The plates 31 and disks 32 are alternately arranged in axial direction. In other words, the brake mechanism 30 includes plates 31 and disks 32 as a plurality of friction engagement elements.

The multiple plates 31 are circumferentially non-rotatably and axially movably engaged at their radial outer ends with the inner peripheral surface of the surrounding wall of the case 7. The multiple disks 32 rotate integrally with the outer drum 25 owing to their radially inner ends being engaged with outer peripheral surface of the outer drum 25 to be circumferentially non-rotatable and axially movable relative to the outer drum 25. A non-contact rotational speed sensor 35 for detecting rotational speed of the outer drum 25 is provided on inner peripheral surface of the case 7 to face outer peripheral surface of the outer drum 25 axially sideward of the brake mechanism 30.

The brake mechanism 30 includes a spring (not shown) for applying biasing force acting to separate the plates 31 and disks 32 and thus release the disks 32 from the plates 31, and a piston (not shown) for applying pushing force acting against the biasing force of the spring to engage the plates 31 and disks 32. The piston is driven by hydraulic pressure supplied through a hydraulic pressure control unit 8. In a state with no hydraulic pressure acting on the piston, the plates 31 and disks 32 separate, thereby releasing (turning OFF) the brake mechanism 30 and allowing rotation of the second ring gear 22. On the other hand, when hydraulic pressure acts on the piston, the plates 31 and disks 32 engage, thereby operating (turning ON) the brake mechanism 30. In this state, rotation of the second ring gear 22 is prevented.

An axis CL1-centered substantially cylindrical inner drum 26 is provided radially inward of and facing the outer drum 25. The second sun gear 21 is connected to an output shaft 27 of a second planetary gear mechanism 20 that extends along axis CL1 and is connected to the inner drum 26, whereby the second sun gear 21, output shaft 27 and inner drum 26 rotate integrally. A clutch mechanism 40 is provided between the outer drum 25 and the inner drum 26.

The clutch mechanism 40 is, for example, structured as a multi-plate wet clutch including multiple radially extending plates (friction members) 41 arranged in axial direction and multiple radially extending disks (friction members) 42 arranged in axial direction (multiple illustration is omitted in the drawing). The plates 41 and disks 42 are alternately arranged in axial direction. In other words, the clutch mechanism 40 includes plates 41 and disks 42 as a plurality of friction engagement elements.

The multiple plates 41 rotate integrally with the outer drum 25 owing to their radial outer ends being engaged with the inner peripheral surface of the outer drum 25 to be circumferentially non-rotatable and axially movable relative to the outer drum 25. The multiple disks 42 rotate integrally with the inner drum 26 owing to their radially inner ends being engaged with outer peripheral surface of the inner drum 26 to be circumferentially non-rotatable and axially movable relative to the inner drum 26.

The clutch mechanism 40 includes a spring (not shown) for applying biasing force acting to separate the plates 41 and disks 42 and thus release the disks 42 from the plates 41, and a piston (not shown) for applying pushing force acting against the biasing force of the spring to engage the plates 41 and disks 42. The piston is driven by hydraulic pressure supplied through the hydraulic pressure control unit 8.

In a state with no hydraulic pressure acting on the piston, the plates 41 and disks 42 separate, thereby releasing (turning OFF) the clutch mechanism 40 and allowing relative rotation of the second sun gear 21 with respect to the second ring gear 22. When rotation of the second ring gear 22 is prevented by the brake mechanism 30 being ON at this time, rotation of the output shaft 27 with respect to the second carrier 24 is accelerated. This state corresponds to speed ratio stage being shifted to high.

On the other hand, when hydraulic pressure acts on the piston, the plates 41 and disks 42 engage, thereby operating (turning ON) the clutch mechanism 40 and integrally joining the second sun gear 21 and second ring gear 22. When rotation of the second ring gear 22 is allowed by the brake mechanism 30 being OFF at this time, the output shaft 27 becomes integral with the second carrier 24 and rotates at the same speed as the second carrier 24. This state corresponds to speed ratio stage being shifted to low.

The second planetary gear mechanism 20, brake mechanism 30 and clutch mechanism 40 configure a speed change mechanism 70 that shifts rotation of the second carrier 24 between two speed stages (high and low) and outputs the shifted rotation from the output shaft 27. Torque transmission path from the first planetary gear mechanism 10 to the output shaft 27 of upstream of the one-way clutch 50 through the speed change mechanism 70 configures a first power transmission path 71.

The output shaft 27 is connected through a one-way clutch 50 to an output gear 51 centered on axis CL1. The one-way clutch 50 allows forward rotation of the output gear 51 with respect to the output shaft 27, i.e., relative rotation corresponding to vehicle forward direction, and prohibits rotation corresponding to vehicle reverse direction. In other words, when rotational speed of the output shaft 27 corresponding to vehicle forward direction is faster than rotational speed of the output gear 51, the one-way clutch 50 locks, whereby the output shaft 27 and output gear 51 rotate integrally. On the other hand, when rotational speed of the output gear 51 corresponding to vehicle forward direction is faster than rotational speed of the output shaft 27, the one-way clutch 50 disengages (unlocks), whereby the output gear 51 freely rotates with respect to the output shaft 27 without torque pulled back.

A rotating shaft 3a of the rotor of the second motor-generator 3 is connected to the output gear 51, so that the output gear 51 and the second motor-generator 3 (rotating shaft 3a) rotate integrally. Since the one-way clutch 50 is interposed between the output shaft 27 and the rotating shaft 3a, forward relative rotation of the rotating shaft 3a with respect to the output shaft 27 is allowed. In other words, when rotational speed of the second motor-generator 3 is faster than rotational speed of the output shaft 27, the second motor-generator 3 efficiently rotates without torque of the output shaft 27 (second planetary gear mechanism 20) pulled back. The one-way clutch 50 is installed radially inward of the rotating shaft 3a. Since axial length of the drive system 100 can therefore be minimized, a smaller drive system 100 can be realized.

A mechanical oil pump (MOP) 60 is installed radially inward of the rotor of the second motor-generator 3. The mechanical oil pump 60 is connected to the output shaft 1a of the engine 1 and driven by the engine 1. Therefore, there is one to one relationship between rotational speed of the engine 1 and rotational speed of the mechanical oil pump 60, and when the engine rotates, the mechanical oil pump 60 also rotates. An amount of hydraulic oil discharged from the mechanical oil pump 60 increases along with increase of rotational speed thereof.

Oil supply necessary when the engine 1 is stopped is covered by driving an electrical oil pump (EOP) 61 with power from the battery 6. The electrical oil pump 61, i.e., electrically powered oil pump 61 is configured as a motor pump driven by an electrical motor. An amount of hydraulic oil discharged from the electrical oil pump 61 increases along with increase of electric power to the electrical motor. An electromagnetic pump reciprocating by an electromagnetic vibrator may configure the electrical oil pump 61.

A large-diameter gear 53 rotatable around a counter shaft 52 lying parallel to axis CL1 meshes with the output gear 51, and torque is transmitted to the counter shaft 52 through the large-diameter gear 53. Torque transmitted to the counter shaft 52 is transmitted through a small-diameter gear 54 to a ring gear 56 of a differential unit 55 and further transmitted through the differential unit 55 to the left and right axles (drive shaft) 57. Since this drives the front wheels 101, the vehicle travels. The rotating shaft 3a, output gear 51, large-diameter gear 53, small-diameter gear 54 and differential unit 55, inter alia, configure a second power transmission path 72 as a torque transmission path from the one-way clutch 50 to the axles 57. The first and second power transmission paths 71 and 72 are connected with each other in series.

The hydraulic pressure control unit 8 includes electromagnetic valve, proportional electromagnetic valve, and other control valves (control valve 8a) actuated in accordance with electric signals. The control valve 8a operates to control hydraulic pressure flow to the brake mechanism 30, clutch mechanism 40 and the like in accordance with instructions from the controller 4. More specifically, the control valve 8a controls hydraulic oil flow to an oil chamber facing piston of the brake mechanism 30 and to an oil chamber facing piston of the clutch mechanism 40. This enables ON-OFF switching of the brake mechanism 30 and clutch mechanism 40. Hydraulic oil flow to the other portion is controlled by other control valve.

The controller (ECU) 4 as an electronic control unit incorporates an arithmetic processing unit having a CPU, ROM, RAM and other peripheral circuits, and the CPU includes an engine control ECU 4a, a speed change mechanism control ECU 4b and a motor-generator control ECU 4c. Alternatively, the multiple ECUs 4a to 4c need not be incorporated in the single controller 4 but can instead be provided as multiple discrete controllers 4 corresponding to the ECUs 4a to 4c.

The controller 4 receives as input signals from, inter alia, the rotational speed sensor 35 for detecting rotational speed of the drum 25, a vehicle speed sensor 36 for detecting vehicle speed, an accelerator opening angle sensor 37 for detecting accelerator opening angle indicative of amount of accelerator pedal depression, and a rotational speed sensor 38 for detecting rotational speed of the engine 1. Although not indicated in the drawings, the controller 4 also receives signals from a sensor for detecting rotational speed of the first motor-generator 2 and a sensor for detecting rotational speed of the second motor-generator 3.

Based on these input signals, the controller 4 decides drive mode in accordance with a predefined driving force map representing vehicle driving force characteristics defined in terms of factors such as vehicle speed and accelerator opening angle. In order to enable the vehicle to travel in the decided drive mode, the controller 4 controls operation of the engine 1, first and second motor-generators 2 and 3, the brake mechanism 30 and the clutch mechanism 40 by outputting control signals to, inter alia, an actuator for regulating throttle valve opening, an injector for injecting fuel, the power control unit 5 and the hydraulic pressure control unit 8 (control valve).

Figures 2, 3:
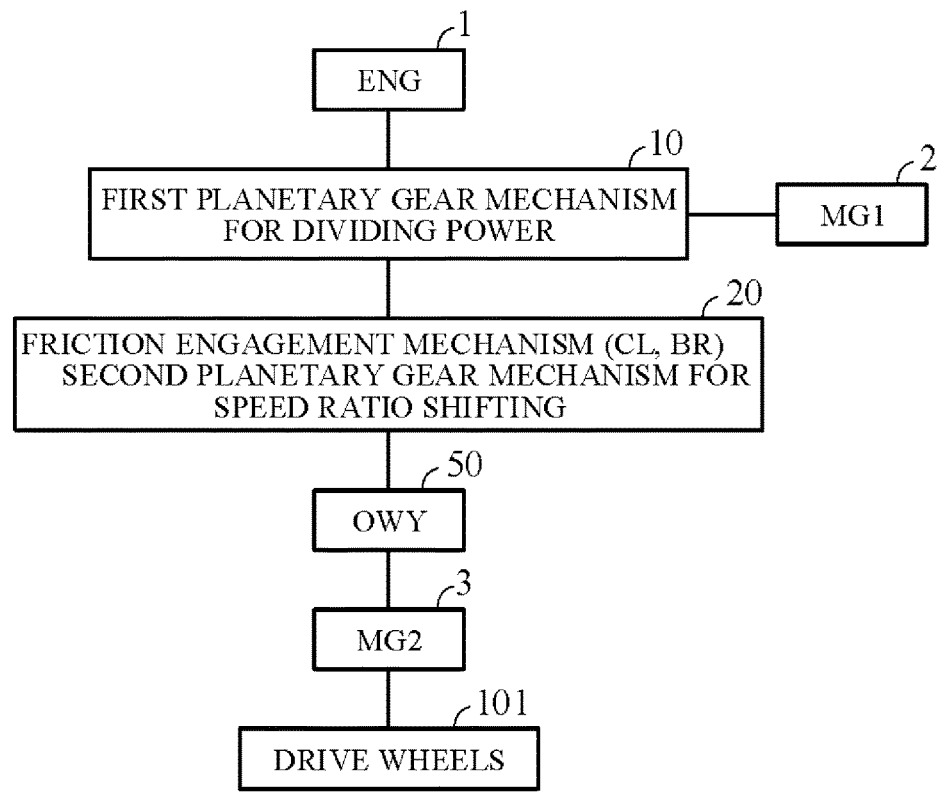
FIG. 2 is a diagram showing an interconnection of main components of the drive system of the hybrid vehicle according to the embodiment of the invention.
FIG. 3 is a diagram an example of drive modes implemented by the drive system of the hybrid vehicle according to the embodiment of the invention.

FIG. 2 is a drawing summarizing interconnection of main components of the drive system 100. As shown in FIG. 2, the first planetary gear mechanism 10 for dividing engine power is connected to the engine 1. The first motor-generator 2 and second planetary gear mechanism 20 for speed ratio shifting are connected to the first planetary gear mechanism 10. The second motor-generator 3 is connected through the one-way clutch 50 to the second planetary gear mechanism 20, and the front wheels 101 are connected to the second motor-generator 3 as drive wheels.

FIG. 3 is a table showing examples of some drive modes that can be implemented by the drive system 100 according to this embodiment of the present invention, along with operating states of the brake mechanism (BR) 30, clutch mechanism (CL) 40, one-way clutch (OWY) 50 and engine (ENG) 1 corresponding to the different modes.

In FIG. 3, EV mode, W motor mode, series mode, HV mode and regeneration mode are shown as typical drive modes. HV mode is subdivided into low mode (HV low mode) and high mode (HV high mode). In the drawing, brake mechanism 30 ON (Engaged), clutch mechanism 40 ON (Engaged), one-way clutch 50 Locked, and engine 1 Operating are indicated by symbol "○", while brake mechanism 30 OFF (Disengaged), clutch mechanism 40 OFF (Disengaged), one-way clutch 50 Unlocked, and engine 1 Stopped are indicated by symbol "x".

Figure 4:
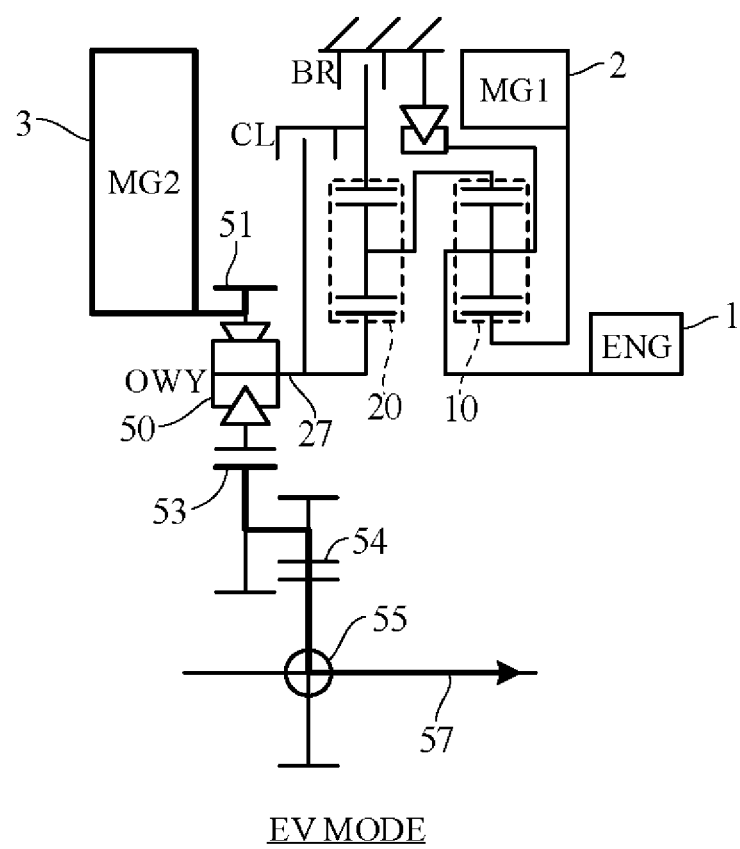
FIG. 4 is a skeleton diagram showing a flow of torque transmission in EV mode in the drive system of FIG. 1.

In EV mode, the vehicle is driven for traveling solely by motive power of the second motor-generator 3. As shown in FIG. 3, in EV mode, the brake mechanism 30 and clutch mechanism 40 are both OFF, and the engine 1 is stopped, in accordance with instructions from the controller 4. FIG. 4 is a skeleton diagram showing flow of torque transmission in EV mode.

As show in FIG. 4, in EV mode, torque output from the second motor-generator 3 is transmitted through the output gear 51, large-diameter gear 53, small-diameter gear 54 and differential unit 55 to the axles 57. At this time, the output shaft 27 stays stopped under action of the one-way clutch 50 and efficient vehicle running can be achieved without torque pulled back (rotational resistance) attributable to rotating elements upstream of the second motor-generator 3 (on second planetary gear mechanism side).

Figure 5:
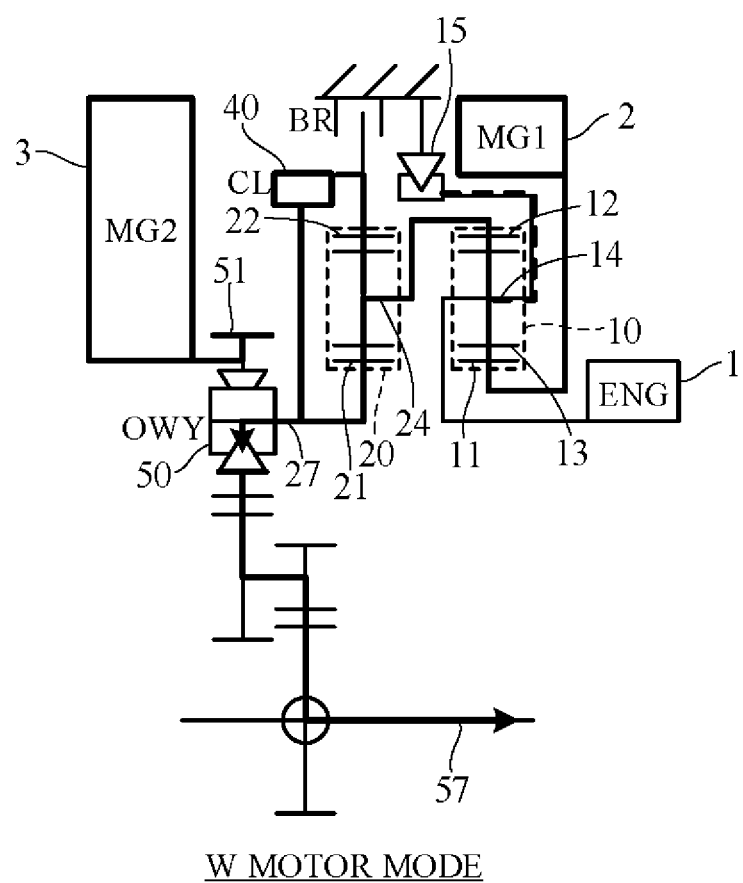
FIG. 5 is a skeleton diagram showing a flow of torque transmission in W motor mode in the drive system of FIG. 1.

In W motor mode, the vehicle is driven for traveling by motive power of the first motor-generator 2 and the second motor-generator 3. As shown in FIG. 3, in W motor mode, the brake mechanism 30 is OFF, the clutch mechanism 40 is ON and the engine 1 is stopped, in accordance with instructions from the controller 4. FIG. 5 is a skeleton diagram showing flow of torque transmission in W motor mode.

As show in FIG. 5, in W motor mode, rotation of the first carrier 14 is prevented by action of the one-way clutch 15, and torque output from the first motor-generator 2 is transmitted through the first sun gear 11, first pinions 13, first ring gear 12, second carrier 24 (second carrier 24 rotating integrally with the second sun gear 21 and second ring gear 22) to the output shaft 27. Torque transmitted to the output shaft 27 is transmitted through the locked one-way clutch 50 to the output gear 51, and transmitted to the axles 57 together with torque output from the second motor-generator 3. Since torque from the first motor-generator 2 and second motor-generator 3 is applied to the axles 57 in this manner in W motor mode, propelling force can be increased to greater than in EV mode.

Figure 6:
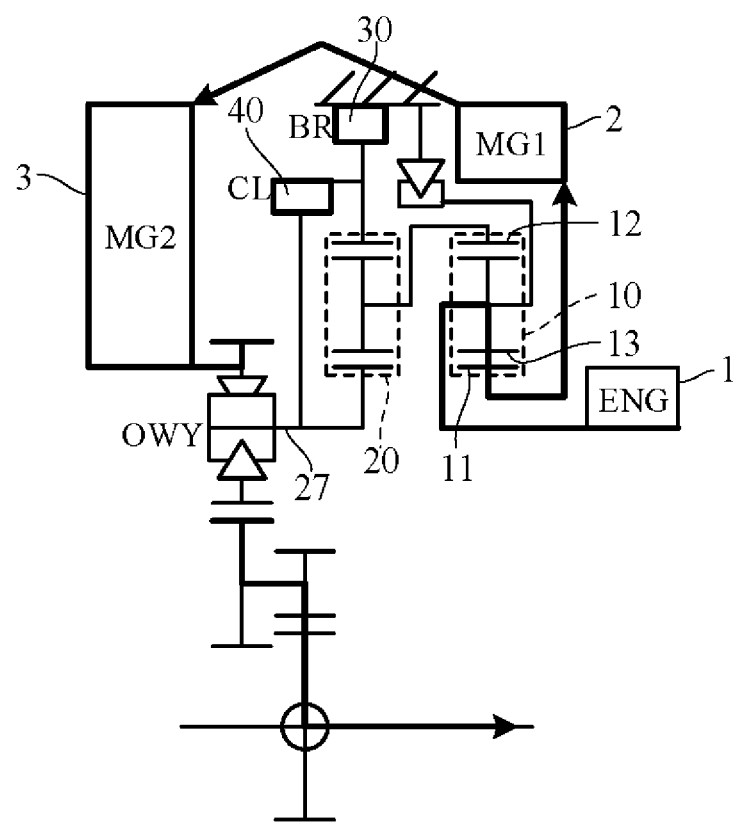
FIG. 6 is a skeleton diagram showing a flow of torque transmission in series mode in the drive system of FIG. 1.

In series mode, the vehicle is driven for traveling by motive power of the second motor-generator 3 while the first motor-generator 2 is being driven by motive power from the engine 1 to generate electric power. As shown in FIG. 3, in series mode, the brake mechanism 30 and clutch mechanism 40 are both ON and the engine 1 is operated, in accordance with instructions from the controller 4. FIG. 6 is a skeleton diagram showing flow of torque transmission in series mode.

As shown in FIG. 6, in series mode, rotation from the first ring gear 12 to as far as the output shaft 27 is stopped, so that all power output from the engine 1 is input through the first pinions 13 and first sun gear 11 to the rotor rotating shaft 2a of the first motor-generator 2. The first motor-generator 2 is therefore driven to generate electric power and this generated electric power is used to drive the second motor-generator 3, whereby the vehicle can travel. In other words, an electrical path is structured for supplying electrical energy generated by the first motor-generator 2 to the second motor-generator 3, whereby running of the vehicle is driven by the second motor-generator 3. In series mode, as in EV mode, pull back of torque is prevented by action of the one-way clutch 50. Amount of power supplied to the second motor-generator 3 through the electrical path is not greater than allowable output of the power control unit 5.

In HV mode, the vehicle is driven for traveling by motive power produced by the engine 1 and the second motor-generator 3. Within the HV mode, the HV low mode corresponds to a mode of wide-open acceleration from low speed, and the HV high mode corresponds to a mode of normal traveling after EV traveling. As shown in FIG. 3, in HV low mode, the brake mechanism 30 is OFF, the clutch mechanism 40 is ON and the engine 1 is operated, in accordance with instructions from the controller 4. In HV high mode, the brake mechanism 30 is ON, the clutch mechanism 40 is OFF and the engine 1 is operated, in accordance with instructions from the controller 4.

Figure 7:
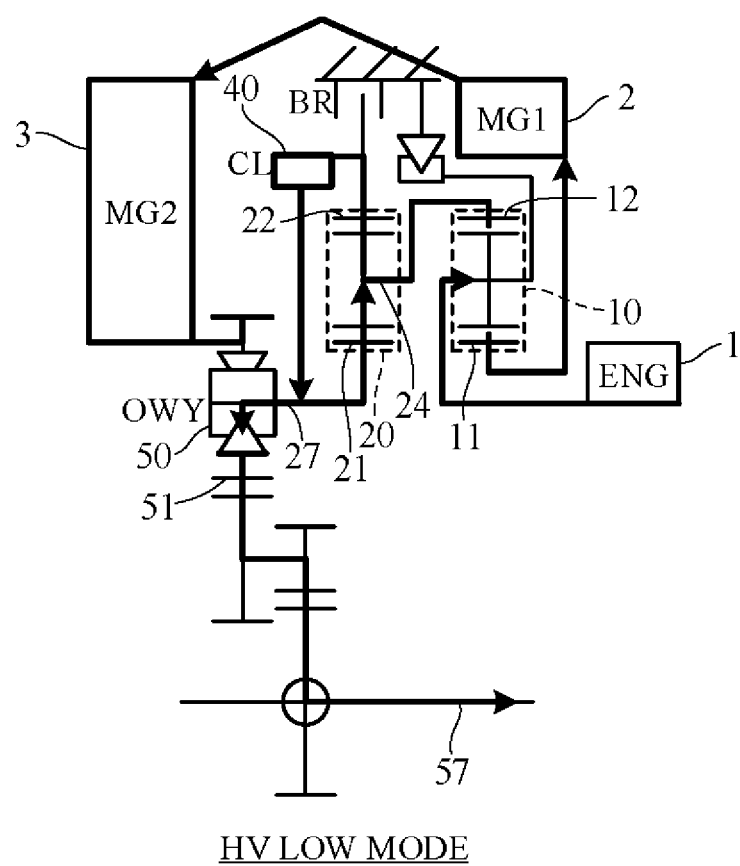
FIG. 7 is a skeleton diagram showing a flow of torque transmission in HV low mode in the drive system of FIG. 1.

FIG. 7 is a skeleton diagram showing flow of torque transmission in HV low mode. As shown in FIG. 7, in HV low mode, some torque output from the engine 1 is transmitted through the first sun gear 11 to the first motor-generator 2. As a result, the battery 6 is charged by power generated by the first motor-generator 2, and, in addition, driving electric power is supplied from the battery 6 to the second motor-generator 3.

In HV low mode, remainder of torque output from the engine 1 is transmitted through the first ring gear 12 and the second carrier 24 (second carrier 24 rotating integrally with the second sun gear 21 and second ring gear 22) to the output shaft 27. Rotational speed of the output shaft 27 at this time is equal to rotational speed of the second carrier 24. Torque transmitted to the output shaft 27 is transmitted through the locked one-way clutch 50 to the output gear 51, and transmitted to the axles 57 together with torque output from the second motor-generator 3. This enables high-torque vehicle running using torque from the engine 1 and second motor-generator 3, while maintaining sufficient battery residual charge with power generated by the first motor-generator 2.

Figure 8:
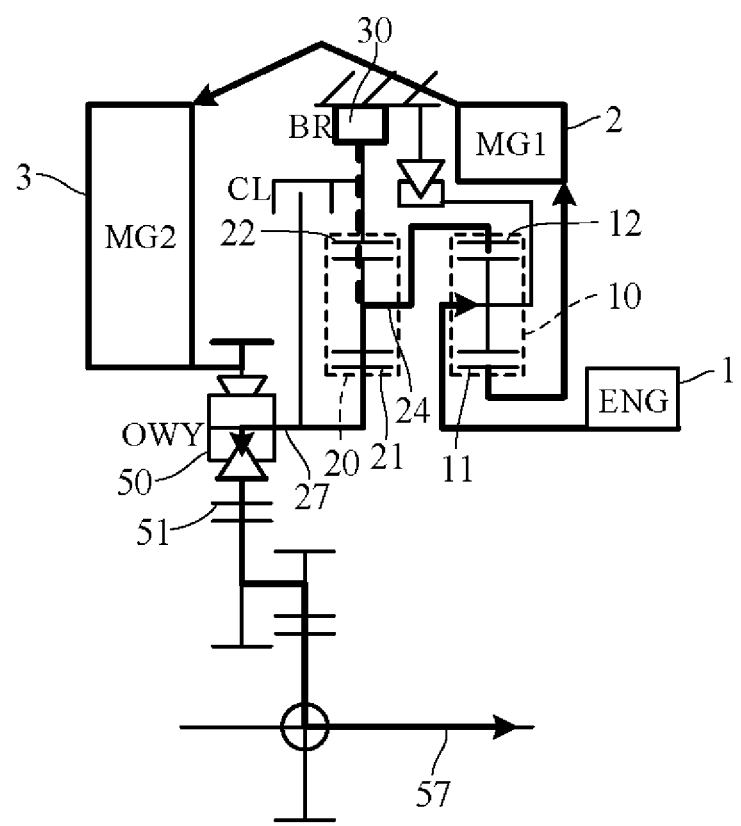
FIG. 8 is a skeleton diagram showing a flow of torque transmission in HV high mode in the drive system of FIG. 1.

FIG. 8 is a skeleton diagram showing flow of torque transmission in HV high mode. As shown in FIG. 8, in HV high mode, similarly to in HV low mode, some torque output from the engine 1, for example, is transmitted through the first sun gear 11 to the first motor-generator 2. Remainder of torque output from the engine 1 is transmitted through the first ring gear 12, second carrier 24 and second sun gear 21 to the output shaft 27. Rotational speed of the output shaft 27 at this time is greater than rotational speed of the second carrier 24.

Torque transmitted to the output shaft 27 is transmitted through the locked one-way clutch 50 to the output gear 51, and transmitted to the axles 57 together with torque output from the second motor-generator 3. Therefore, by utilizing torque from the engine 1 and second motor-generator 3 while maintaining sufficient battery residual charge, vehicle running can be achieved at torque that, while lower than that in HV low mode, is higher than that in EV mode. Since rotation of the output shaft 27 is speeded up by the second planetary gear mechanism 20 in HV high mode, running at lower engine speed than in HV low mode can be realized.

Figure 9:
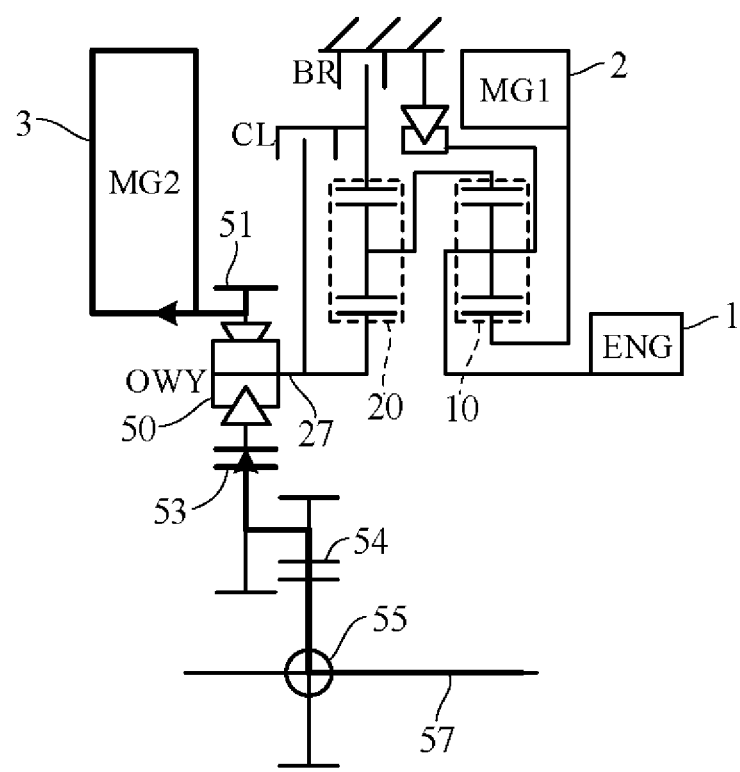
FIG. 9 is a skeleton diagram showing a flow of torque transmission in regeneration mode in the drive system of FIG. 1.

In regeneration mode, the second motor-generator 3 is rotated by torque input from the axle 57 and generates electric power, and thus decelerating force is applied to the vehicle. As shown in FIG. 3, in regeneration mode, as in EV mode, the brake mechanism 30 and clutch mechanism 40 are both OFF, and the engine 1 is stopped, in accordance with instructions from the controller 4. FIG. 9 is a skeleton diagram showing flow of torque transmission in regeneration mode.

As shown in FIG. 9, in regeneration mode, torque input from the axle 57 is transmitted through the differential unit 55, small-diameter gear 54, large-diameter gear 53 and output gear 51 to the rotor of the second motor-generator 3. At this time, under action of the one-way clutch 50, efficient vehicle decelerating can be achieved without torque pulled back attributable to rotating elements upstream of the second motor-generator 3 (on second planetary gear mechanism side). However, depending on the situation, one-way clutch 50 may locks and affect rotating elements upstream of the second motor-generator 3.

In this regard, attention should be given to the point that drivers of hybrid vehicles include various types with different preferences. For example, some drivers prefer high fuel efficiency driving and some prefer high power performance driving. The present embodiment is therefore configured as described in the following so that travel performance can be changed in accordance with driver preference and further configured so that operation of the electrical oil pump 61 is controlled in a manner matched to the respective types of travel performance. Specifically, the control valve 8a and the electrical oil pump 61 are controlled so as to maximize fuel economy for a driver who prefers emphasis on fuel economy performance and to prevent loss of power performance for a driver who prefers emphasis on power performance.

Figure 10:
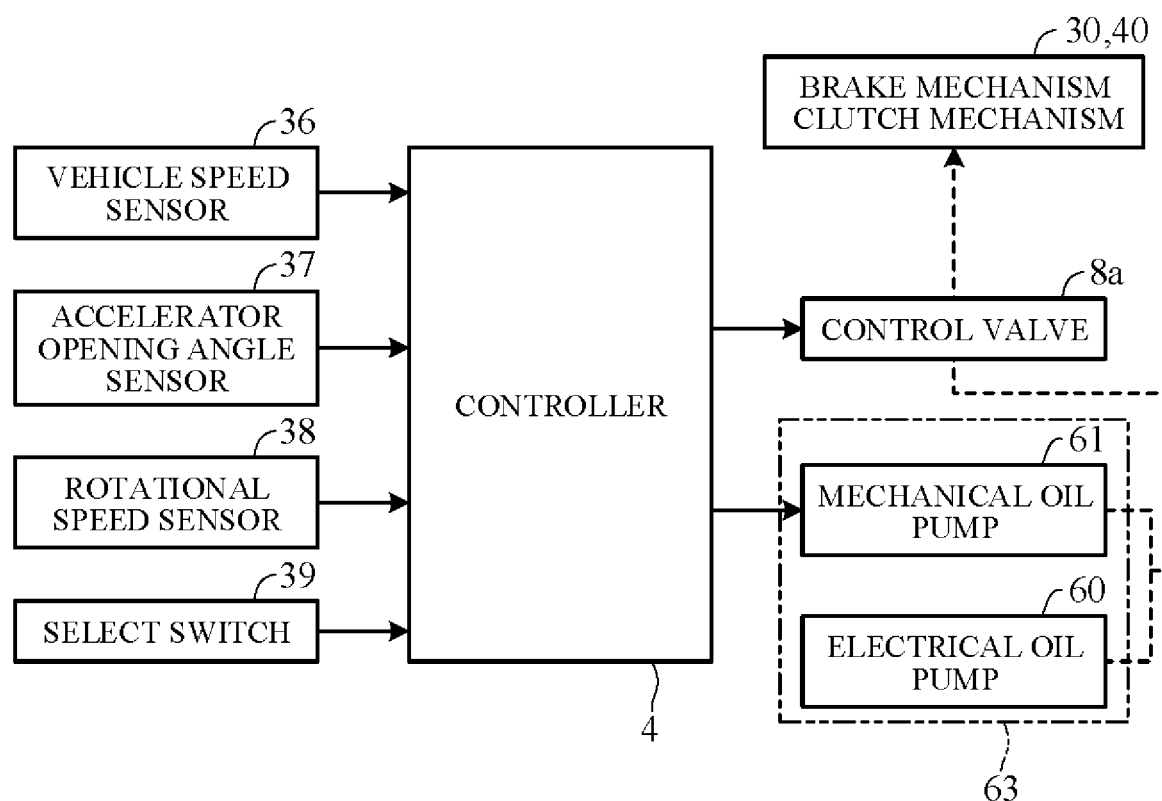
FIG. 10 is a block diagram showing main control configuration of the drive system of FIG. 1.

FIG. 10 is a block diagram showing main control configuration of the drive system 100 according to the present invention, namely, a diagram showing part of the configuration of FIG. 1 more concretely. Flow of hydraulic oil from the oil pumps 60 and 61 is indicated by dotted lines in FIG. 10.

As shown in FIG. 10, the mechanical oil pump 60 and electrical oil pump 61 are installed in parallel, and an associated hydraulic circuit is configured to merge discharge oil from the oil pumps 60 and 61. The mechanical oil pump 60 and electrical oil pump 61 jointly configure a hydraulic pressure source 63. Discharge oil from the oil pumps 60 and 61, i.e., hydraulic oil discharged from the hydraulic pressure source 63, is supplied through the control valve 8a located downstream of the confluence point to the brake mechanism 30 and the clutch mechanism 40 in order to operate the brake and clutch mechanisms 30 and 40. Although not indicated in the drawing, discharge oil from the hydraulic pressure source 63 is used not only as hydraulic oil but also as lubricating oil supplied to components of the drive system 100 and as coolant oil supplied to the first and second motor-generators 2 and 3 and other hot components.

The controller 4 receives input signals from the vehicle speed sensor 36, the accelerator opening angle sensor 37, the rotational speed sensor 38, and a select switch 39. The select switch 39 is a switch for selecting either eco mode for prioritizing fuel efficiency or normal mode for prioritizing power performance over fuel economy. The select switch 39 is switched in response to operation of an operation member provided, for example, at a driver's seat. The controller 4 performs prescribed processing based on the aforesaid input signals and outputs control signals to the control valve 8a (actually to a solenoid of the control valve 8a) and to the electrical oil pump 61 (actually to a drive circuit of an electric motor for driving the oil pump). Although the controller 4 also outputs control signals to the engine 1 (its throttle valve, injectors and the like) and to the power control unit 5 for controlling the first and second motor-generators, these aspects are omitted in FIG. 10.

Figure 11:
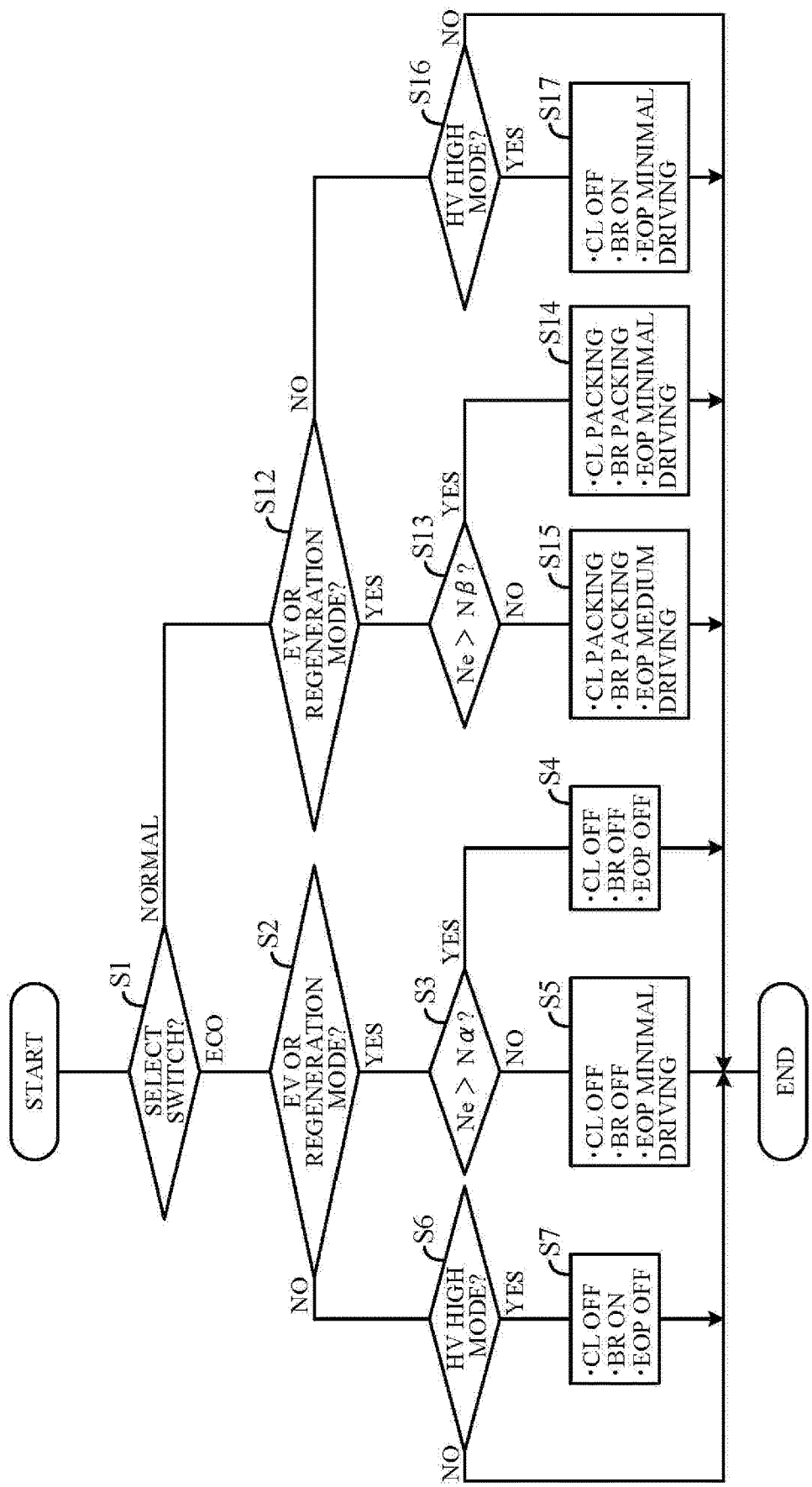
FIG. 11 is a flowchart showing an example of a processing performed by a controller of FIG. 1.

FIG. 11 is a flowchart showing an example of processing performed by the CPU of the controller 4 of FIG. 10 in accordance with a program stored in memory in advance. The processing indicated by this flowchart is repeatedly performed periodically at predetermined intervals. Although HV mode includes HV low mode and HV high mode, the explanation that follows is for convenience made assuming HV mode to be HV high mode.

First, in S1 (S: processing Step), which of eco mode and normal mode is selected by the select switch 39 is determined. When selection of eco mode is determined in S1, the routine proceeds to S2.

In S2, whether either EV mode or regeneration mode is instructed as drive mode is determined. Specifically, signals from the vehicle speed sensor 36 and the accelerator opening angle sensor 37 are used to determine whether operating point dependent on vehicle speed and required driving force is within an EV mode or a regeneration mode region on a predetermined driving force map created in advance. If a positive decision is made in S2, the routine proceeds to S3.

In S3, whether engine speed Ne of the engine 1 detected by the rotational speed sensor 38 is greater than predetermined value Nα is determined. This is for determining whether pressure oil discharged from the mechanical oil pump 60 that rotates together with the engine 1 can be used for lubrication, cooling or the like. This determination is made because the mechanical oil pump 60 is in a state of rotating together with the engine 1 also in EV mode and regeneration mode. Immediately after transitioning from HV mode to EV mode or regeneration mode (immediately after fuel cut-off), for example, the engine 1 and mechanical oil pump 60 rotate inertially so that lubricating oil and coolant oil can be supplied from the mechanical oil pump 60 to components of the drive system 100. Similarly, the mechanical oil pump 60 also rotates immediately after engine starting up to before the brake mechanism 30 and clutch mechanism 40 switch to HV mode condition.

In light of this, predetermined value Nα of S3 is defined as engine speed enabling supply of minimum required lubricating oil and coolant oil to the drive system 100 solely from the mechanical oil pump 60. Predetermined value Nα is, for example, set to a value derived empirically in advance. Optionally, a sensor for detecting rotational speed of the mechanical oil pump 60 can be installed in place of the rotational speed sensor 38 and whether rotational speed detected by this sensor is greater than predetermined value be determined in S3. If a positive decision is made in S3, the routine proceeds to S4, and if a negative decision is made, proceeds to S5.

In S4, the brake mechanism 30 and clutch mechanism 40 are both turned OFF by outputting control signals to the control valve 8a instructing it to stop supply of hydraulic oil to the brake mechanism 30 and clutch mechanism 40. In addition, the electrical oil pump 61 is turned OFF (stopped) by cutting off supply of power to the electrical oil pump 61. Since Ne>Nα at this time, required lubricating oil and coolant oil are supplied to the drive system 100 from the mechanical oil pump 60.

In S5, on the other hand, first, similarly to in S4, the brake mechanism 30 and clutch mechanism 40 are both turned OFF by outputting control signals to the control valve 8a instructing it to stop supply of hydraulic pressure to the brake mechanism 30 and clutch mechanism 40. Then, differently from in S4, minimal driving electric power is supplied to the electrical oil pump 61 to drive the electrical oil pump 61 (in what is called "minimal driving") and discharge low pressure oil, e.g. pressure oil of approximately atmospheric pressure, from the electrical oil pump 61. This pressure oil is supplied to components requiring lubrication or cooling. In other words, in S5, minimal driving of the electrical oil pump 61 is performed so as perform minimal lubrication and/or cooling with discharge oil of the electrical oil pump 61 in EV mode or regeneration mode. If a negative decision is made in S2, i.e., when drive mode is neither EV mode nor regeneration mode, the routine proceeds to S6.

In S6, whether HV mode (e.g., HV high mode) is instructed as drive mode is determined. Specifically, operating point is ascertained based on signals from the vehicle speed sensor 36 and accelerator opening angle sensor 37, and whether the operating point ascertained is within HV high mode region of a predetermined driving force map created in advance is determined. If a positive decision is made in S6, the routine proceeds to S7.

In S7, post-engine-start processing is performed. Although not shown in the drawing, the following engine start-processing is performed prior to S7. When the engine 1 is started, predetermined driving electric power is first supplied to the electrical oil pump 61 to drive the electrical oil pump 61 (in what is called "maximal driving"), and control signals are output to the control valve 8a instructing it to turn ON both the brake mechanism 30 and the clutch mechanism 40 by supplying pressure oil (hydraulic oil) from the electrical oil pump 61 also to the brake mechanism 30 and the clutch mechanism 40. More driving electric power is required for maximally driving than for minimally driving the electrical oil pump 61. In maximally driven state, the electrical oil pump 61 supplies not only hydraulic oil but also adequate amounts of lubricating oil and coolant oil to components of the drive system 100.

Next, the first motor-generator 2 is made to work as a motor and its rotation is applied to rotate the output shaft 1a of the engine 1 and thereby start the engine 1. Once the engine starts, the mechanical oil pump 60 rotates and supplies pressure oil to components of the drive system 100.

In S7, control signals are output to the control valve 8a after engine starting to instruct it to turn the brake mechanism 30 ON and the clutch mechanism 40 OFF. Namely, the brake mechanism 30 and clutch mechanism 40 are switched so as to implement HV high mode as drive mode. At the same time, the electrical oil pump 61 is turned OFF by stopping supply of electric power thereto. The brake mechanism 30 is therefore kept on by pressure oil from the mechanical oil pump 60. If a negative decision is made in S6, i.e., when other than EV mode, regeneration mode and HV mode (HV high mode) is determined to be instructed, driving of the control valve 8a and electrical oil pump 61 is controlled by processing not shown in the drawing.

The aforesaid processing is that when eco mode is selected by the select switch 39. When the determination in S1 is instead that normal mode is selected, the routine proceeds to S12. In S12, similarly to in S2, whether either EV mode or regeneration mode is instructed as drive mode is determined. If a positive decision is made in S12, the routine proceeds to S13.

In S13, whether engine speed Ne of the engine 1 detected by the rotational speed sensor 38 is greater than predetermined value Nβ is determined. This step is for determining whether "packing" of the frictional engagement elements of the clutch mechanism 40 or brake mechanism 30 can be performed by pressure oil discharged from the mechanical oil pump 60 that rotates together with the engine 1, with the electrical oil pump 61 in minimally driven. By "packing" is meant to reduce gaps between the frictional engagement elements, namely, the plates 31 and disks 32 (the plates 41 and disks 42), by driving the piston of the brake mechanism 30 (the piston of the clutch mechanism 40) in element engaging direction. This packing is done in preparation for engaging the frictional engagement elements, and when performed, enables engaging action of the brake mechanism 30 and the clutch mechanism 40 to be rapidly performed. As such, it enhances responsiveness at engine starting and enables rapid drive mode switching.

Hydraulic pressure needed for packing (packing pressure) is higher than atmospheric pressure but lower than pressures required for engaging the brake mechanism 30 and the clutch mechanism 40. For example, it is at maximum only around 2 bar ($2\times10^5$ Pa) under very low temperature condition. Should only the electrical oil pump 61 be relied on for obtaining this packing pressure, discharge volume of the electrical oil pump 61 must be increased to greater than when it is minimally driven, and therefore more driving electric power needs to be supplied to the electrical oil pump 61 than during minimal driving. The driven condition of the electrical oil pump 61 in this case is referred to as "medium driving." Driving electric power during medium driving of the electrical oil pump 61 is less than during maximal driving. When the engine 1 is rotating at or above predetermined value $N\beta$, required packing pressure can be obtained even if the electrical oil pump 61 is minimally driven because pressure oil of predetermined amount or greater is discharged from the mechanical oil pump 60. Predetermined value $N\beta$ of S13 is, for example, a value derived empirically in advance. Optionally, predetermined value $N\beta$ can be set equal to predetermined value $N\alpha$ of S3. If a positive decision is made in S13, the routine proceeds to S14, and if a negative decision is made, proceeds to S15.

In S14, control signals are output to the control valve 8a instructing it to supply pressure oil (packing pressure) to the clutch mechanism 40 and brake mechanism 30 in preparation for starting of the engine 1. At the same time, the electrical oil pump 61 is supplied with driving electric power for minimal driving. The reason for this is that since packing pressure is partially covered by discharge oil of the mechanical oil pump 60 in this case, it suffices to minimally drive the electrical oil pump 61 conjointly with operation of the mechanical oil pump 60 with no need to mediumly drive the electrical oil pump 61.

Since discharge oil of the mechanical oil pump 60 and discharge oil of the electrical oil pump 61 are therefore supplied to the brake mechanism 30 and the clutch mechanism 40, the brake mechanism 30 assumes a packed state of contracted spacing between the plates 31 and disks 32 and clutch mechanism 40 assumes a packed state of contracted spacing between the plates 41 and disks 42.

In S15, control signals are sent to the control valve 8a instructing it to supply pressure oil (packing pressure) to the brake mechanism 30 and clutch mechanism 40 in preparation for engine starting. At the same time, the electrical oil pump 61 is supplied with driving electric power for medium driving. The reason for this is that since packing pressure must be completely or almost completely covered by discharge oil of the electrical oil pump 61 in this case, the electrical oil pump 61 needs to be mediumly driven. Since discharge oil of the mediumly driven electrical oil pump 61 is supplied to the brake mechanism 30 and the clutch mechanism 40, the brake mechanism 30 and the clutch mechanism 40 both assume packed state. If a negative decision is made in S12, the routine proceeds to S16.

In S16, similarly to in S6, whether HV mode (e.g., HV high mode) is instructed as drive mode is determined. If a positive decision is made in S16, the routine proceeds to S17. If a negative decision is made in S16, i.e., when other than EV mode, regeneration mode and HV mode (HV high mode) is determined to be instructed, driving of the control valve 8a and electrical oil pump 61 is controlled by processing not shown in the drawing.

In S17, similarly to in S7, post-engine-start processing is performed. In other words, engine start-processing is performed prior to S17. In S17, control signals are output to the control valve 8a instructing it to turn the brake mechanism 30 ON and the clutch mechanism 40 OFF. Namely, the brake mechanism 30 and clutch mechanism 40 are switched so as to implement HV high mode as drive mode. At the same time, the electrical oil pump 61 is supplied with driving electric power for minimal driving. The brake mechanism 30 is therefore supplied not only discharge oil from the mechanical oil pump 60 but also discharge oil from the electrical oil pump 61.

Although the foregoing explanation regarding HV mode is focused on HV high mode, it similarly applies when HV mode is HV low mode. In this case, whether HV low mode is instructed as drive mode is determined in S6 and S16, and the clutch mechanism 40 is turned ON and the brake mechanism 30 turned OFF in S7 and S17. Other processing steps are performed in the same way as above.

FIG. 12 is table-formatted overview of operations of the clutch mechanism 40 (CL), brake mechanism 30 (BR), and electrical oil pump 61 (EOP). Symbol "x" and symbol "○" appearing in the CL and BR columns of the drawing respectively indicate OFF state and ON state of the clutch mechanism 40 or the brake mechanism 30. Symbol "Δ" appearing in the same columns indicates packed state of the clutch mechanism 40 or brake mechanism 30 when supplied with packing pressure.

When in EV mode or regeneration mode under eco mode, the drive system 100 requires minimal pressure oil for lubrication and cooling because, as indicated in FIG. 12, the clutch mechanism 40 and brake mechanism 30 are OFF. Therefore, when engine speed Ne is predetermined value $N\alpha$ or below, the electrical oil pump 61 is minimally driven (S5), and when Ne exceeds predetermined value $N\alpha$, the electrical oil pump 61 is stopped (S4). As a result, electric power consumption for driving the electrical oil pump 61 can be minimized.

When in HV high mode under eco mode, the mechanical oil pump 60 is driven by the engine 1 and discharge oil from the mechanical oil pump 60 is used both for engaging the brake mechanism 30 and also for lubrication and cooling, while the electrical oil pump 61 is stopped (S7). Thus in eco mode, the electrical oil pump 61 is driven only minimally when Ne≤$N\alpha$ in EV mode or regeneration mode, and since occasions of driving the electrical oil pump 61 are therefore minimized, fuel efficiency can be improved.

When in EV mode or regeneration mode under normal mode, the electrical oil pump 61 is mediumly driven when engine speed Ne is predetermined value $N\beta$ or below, and the brake mechanism 30 and the clutch mechanism 40 are supplied with packing pressure and assume packed state (S15). This upgrades responsiveness at engine starting because it enables both the brake mechanism 30 and the clutch mechanism 40 to be turned ON (engaged) immediately. Moreover, owing to the provision of the one-way clutch 50 upstream of the second motor-generator 3, drive mode can be smoothly switched while preventing negative acceleration due to pull back of torque even when the brake mechanism 30 and clutch mechanism 40 assume packed state.

In EV mode or regeneration mode under normal mode, when engine speed Ne exceeds predetermined value Nβ and the mechanical oil pump 60 is discharging pressure oil, packing pressure is supplied to the brake mechanism 30 and clutch mechanism 40 in preparation for engine starting. Concomitantly with driving of the mechanical oil pump 60 at this time, driving of the electrical oil pump 61 is changed from medium driving to minimal driving (S14). As a result, rapid switching to HV high mode can be achieved while also inhibiting consumption of power by the electrical oil pump 61. Since the electrical oil pump 61 is minimally driven in HV high mode (S17), total discharge oil volume of the hydraulic pressure source is greater than in eco mode. Necessary and sufficient pressure oil can therefore be supplied to components of the drive system 100 even at times of low engine speed Ne.

The present embodiment can achieve advantages and effects such as the following:

(1) The drive system 100 of the hybrid vehicle according to the present invention includes: the internal combustion engine 1; the first motor-generator 2; the first planetary gear mechanism 10 connected to the engine 1 for dividing and outputting motive power generated by the engine 1 to the first motor-generator 2 and the first power transmission path 71; the second motor-generator 3 connected to the second power transmission path 72 between the first power transmission path 71 and axles 57; the speed change mechanism 70 provided in the first power transmission path 71 to be capable of switching drive mode to at least EV mode driven by motive power of the second motor-generator 3, with driving by the engine 1 stopped, and HV mode driven by motive power of the engine 1 and the second motor-generator 3; the hydraulic pressure source 63 including the mechanical oil pump 60 connected to and driven by the engine 1 and the electrical oil pump 61 driven by driving electric power; the control valve 8a of the hydraulic pressure control unit 8 for controlling flow of pressure oil from the hydraulic pressure source 63 to the speed change mechanism 70; the select switch 39 for selecting either eco mode for prioritizing fuel efficiency or normal mode for prioritizing power performance; and the controller 4 responsive to select action of the select switch 39 for controlling the control valve 8a and driving electric power of the electrical oil pump 61 (FIGS. 1 and 10). The speed change mechanism 70 is adapted to implement HV mode utilizing hydraulic oil of predetermined hydraulic pressure supplied from the hydraulic pressure source 63. The controller 4 controls the control valve 8a and driving electric power of the electrical oil pump 61, in a state of EV mode being instructed as drive mode, so that in response to selection of eco mode by the select switch 39 supply of hydraulic oil to the speed change mechanism 70 is stopped and predetermined electric power (first electric power) is supplied to the electrical oil pump 61 to minimally drive the electrical oil pump 61 and, so that in response to selection of normal mode by the select switch 39, hydraulic oil of lower pressure than the aforesaid hydraulic pressure, namely, packing pressure, is supplied to the speed change mechanism 70 and predetermined electric power (second electric power greater than first electric power) is supplied to the electrical oil pump 61 to mediumly drive the electrical oil pump 61.

As a result, one or the other of eco mode and normal mode can be selected by operating the select switch 39. When eco mode is selected, supply of hydraulic oil to the speed change mechanism 70 is stopped and the electrical oil pump 61 is minimally driven, while when normal mode is selected, packing pressure is supplied to the speed change mechanism 70 and the electrical oil pump 61 is mediumly driven. As a result, travel performance can be changed in accordance with driver preference, and operation of the electrical oil pump 61 can be optimized for the selected travel performance. Namely, fuel economy can be improved to the utmost in eco mode and faster responsiveness of speed change mechanism 70 operations can be achieved in normal mode.

(2) The speed change mechanism 70 can also switch drive mode to a regeneration mode in which the second motor-generator 3 performs regenerative braking, and the control valve 8a and electrical oil pump 61 are controlled as described in the foregoing not only in EV mode but also in regeneration mode. In regeneration mode also, therefore, travel performance can be changed in accordance with driver preference and operation of the electrical oil pump 61 can be optimized for the selected travel performance.

(3) The hybrid vehicle drive system 100 further includes the rotational speed sensor 38 for detecting rotational speed Ne of the engine 1 (FIG. 10). When EV mode or regeneration mode is instructed and eco mode is selected by the select switch 39, the controller 4 responds to detection of rotational speed of not greater than predetermined value Nα by the rotational speed sensor 38 by controlling driving electric power of the electrical oil pump 61 so as to minimally drive the electrical oil pump 61 and responds to detection of rotational speed exceeding predetermined value Nα by controlling driving electric power of the electrical oil pump 61 so as to stop the electrical oil pump 61. In eco mode, therefore, when pressure oil is supplied from the mechanical oil pump 60 under inertial rotation or the like of the engine 1, additionally improved fuel efficiency can be realized because the electrical oil pump 61 is stopped.

(4) When EV mode or regeneration mode is instructed and normal mode is selected by the select switch 39, the controller 4 responds to detection of rotational speed of not greater than predetermined value Nβ by the rotational speed sensor 38 by controlling driving electric power of the electrical oil pump 61 so as to mediumly drive the electrical oil pump 61 and responds to detection of rotational speed exceeding predetermined value Nβ by controlling driving electric power of the electrical oil pump 61 so as to minimally drive the electrical oil pump 61. In normal mode, therefore, the electrical oil pump 61 is driven at low power conjointly with operation of the mechanical oil pump 60, so that improvement of fuel efficiency can be realized while also enhancing responsiveness of switching to HV mode.

(5) The controller 4 controls the control valve 8a so as to supply hydraulic oil of predetermined hydraulic pressure to the speed change mechanism 70 when HV mode is instructed as drive mode, and controls driving electric power of the electrical oil pump 61 so as to stop the electrical oil pump 61 when eco mode is selected by the select switch 39 and so as to minimally drive the electrical oil pump 61 when normal mode is selected by the select switch 39. The electrical oil pump 61 can therefore be driven in a manner optimum for the respective eco and normal modes under HV mode.

(6) The drive system 100 of the hybrid vehicle further includes the one-way clutch 50 interposed between the output shaft 27 of the first power transmission path 71 and the output gear 51 constituting input shaft of the second power transmission path 72 and configured so that when in locked state the output shaft 27 and the output gear 51 rotate integrally and that when in unlocked state the output gear 51 relatively rotates in relation to the output shaft 27 (FIG. 1). The speed change mechanism 70 includes: the second planetary gear mechanism 20 having the second sun gear 21 connected to the output shaft 27, the second carrier 24 connected to the first planetary gear mechanism 10, and the second ring gear 22; the brake mechanism 30 for braking or not braking rotation of the second ring gear 22; and the clutch mechanism 40 for integrally joining or separating the second sun gear 21 and the second ring gear 22. The controller 4 controls the control valve 8a to disengage the brake mechanism 30 and disengage the clutch mechanism 40 when implementing EV mode, and to engage either the brake mechanism 30 or the clutch mechanism 40 and disengage the other thereof when implementing HV mode. This enables typical drive modes of a hybrid vehicle, namely, EV mode and HV mode, to be readily implemented with a simple configuration solely for controlling engaging actions of the brake mechanism 30 and the clutch mechanism 40. Further, owing to provision of the one-way clutch 50 upstream of the second motor-generator 3 in the torque transmission path to the axle 57, even if friction engagement elements of the speed change mechanism 70 are engaged in EV or regeneration mode by driving of the second motor-generator 3, packing of speed change mechanism 70 (brake mechanism 30, clutch mechanism 40) can be easily realized without harmful effects for traveling force.

Various modifications of the aforesaid embodiment are possible. Some examples are explained in the following. In the aforesaid embodiment (FIG. 11), predetermined value Nα of rotational speed of engine 1 is set based on whether minimum required lubricating oil can be supplied to portions of the drive system 100 when the electrical oil pump 61 is stopped. However, predetermined value Nα may be set based on whether packing pressure can be supplied to the brake mechanism 30 and clutch mechanism 40. In the aforesaid embodiment (FIG. 1), the speed change mechanism 70 are configured by the second planetary gear mechanism 20, brake mechanism 30 and clutch mechanism 40, and drive mode is switched in accordance with operation of the speed change mechanism 70. However, a mode change mechanism is not limited to this configuration. The speed change mechanism 70 need not have one each of a brake mechanism and a clutch mechanism, but can instead have a pair of brake mechanisms or a pair of clutch mechanisms. In the aforesaid embodiment (FIG. 1), the first planetary gear mechanism 10 is adapted to divide motive power generated by the engine 1 to the first motor-generator 2 and the second carrier 24 in the first power transmission path 71. However, a power division mechanism is not limited to the aforesaid configuration.

In the aforesaid embodiment (FIG. 1), the control valve 8a of the hydraulic pressure control unit 8 controls flow of hydraulic oil from the hydraulic pressure source 63 to the speed change mechanism 70. However, a valve unit is not limited to the aforesaid configuration. In the aforesaid embodiment, eco mode (first travel mode) prioritizing a fuel economy performance or normal mode (second travel mode) prioritizing a power performance is selected by the select switch 39. However, other travel modes such as sport mode may be selected. Therefore, a selecting portion is not limited to the aforesaid configuration.

In the aforesaid embodiment (FIG. 11), when in EV mode or regeneration mode, the controller 4 serving as an electronic control unit (microprocessor) controls the control valve 8a and the electrical oil pump 61 in response to eco mode being selected so as to stop supply of hydraulic oil to the speed change mechanism 70 and drive (minimally drive) the electrical oil pump 61 with first electric power and in response to normal mode being selected so as to supply packing pressure to the speed change mechanism 70 and to drive (mediumly drive) the electrical oil pump 61 with second power. However, such processing can be performed when in another drive mode, as a predetermined drive mode including EV mode and not including HV mode. For example, coasting mode can be included in the predetermined drive mode instead of regeneration mode (regenerative braking mode) or in addition to regeneration mode.

In the aforesaid embodiment (FIG. 1), when in eco mode, driving electric power of the electrical oil pump 61 is changed depending on whether the rotational speed sensor 38 serving as a speed detector detects engine speed Ne of not greater than predetermined value Nα (first predetermine value), and when in normal mode, driving electric power of the electrical oil pump 61 is changed depending on whether the rotational speed sensor 38 detects engine speed Ne of not greater than predetermined value Nβ (second predetermine value). However, the manner of changing driving electric power is not limited to the aforesaid. In the aforesaid embodiment (FIG. 1), the one-way clutch 50 is interposed between the output shaft 27 of the first power transmission path 71 and the output gear 51 (input shaft) of the second power transmission path 72. However, the drive system can be configured to exclude the one-way clutch 50.

In the aforesaid embodiment (FIG. 1), the drive system 100 is configured in a way that requires overlapping engagement of the brake mechanism 30 and the clutch mechanism 40 at engine starting. However, the drive system can be configured to enable engine starting with only one or the other of the brake mechanism and clutch mechanism turned ON. In such case, a configuration can be adopted that, when in normal mode, for example, responds to Ne>Nβ in a predetermined drive mode, e.g., EV mode, not by putting both the clutch mechanism and the brake mechanism in packed state but by putting only one of them in packed state. Moreover, a configuration can be adopted that in HV mode does not turn ON only one or the other of the clutch mechanism and the brake mechanism but turns both of them ON.

The above embodiment can be combined as desired with one or more of the above modifications. The modifications can also be combined with one another.

According to the present invention, it is possible to change travel performance of a hybrid vehicle in accordance with driver preference and drive an electrical oil pump in a manner matched to travel performance.

Above, while the present invention has been described with reference to the preferred embodiments thereof, it will be understood, by those skilled in the art, that various changes and modifications may be made thereto without departing from the scope of the appended claims.

What is claimed is:

1. A drive system of a hybrid vehicle, comprising:
an internal combustion engine;
a first motor-generator;
a first power transmission path and a second power transmission path connected with each other in series;
a power division mechanism connected to the internal combustion engine to divide a power generated by the internal combustion engine to the first motor-generator and the first power transmission path;
a second motor-generator connected to the second power transmission path;
a mode change mechanism provided in the first power transmission path so as to switch a drive mode to one of a plurality of drive modes including an EV mode in which the hybrid vehicle is driven by a power of the second motor-generator with the internal combustion engine stopped and a HV mode in which the hybrid vehicle is driven by the power of the second motor-generator and the power generated by the internal combustion engine;
a hydraulic pressure source including a first oil pump connected to the internal combustion engine to be driven by the internal combustion engine and a second oil pump driven by a driving electric power;
a valve unit configured to control a flow of a hydraulic oil supplied from the hydraulic pressure source to the mode change mechanism;
a selecting portion configured to select a first travel mode prioritizing a fuel economy performance or a second travel mode prioritizing a power performance; and
an electronic control unit including a microprocessor and a memory and configured to perform controlling the valve unit and the driving electric power for the second oil pump, in accordance with an operation of the selecting portion, wherein
the mode change mechanism is configured so that the drive mode is switched to the HV mode by the hydraulic oil of a predetermined hydraulic pressure supplied from the hydraulic pressure source, and
the microprocessor is configured to perform
the controlling including controlling the valve unit and the driving electric power in a predetermined drive mode including the EV mode and not including the HV mode, so as to stop to supply the hydraulic oil to the mode change mechanism and drive the second oil pump by a first driving electric power when the first travel mode is selected by the selecting portion, while so as to supply the hydraulic oil of a hydraulic pressure lower than the predetermined hydraulic pressure to the mode change mechanism and drive the second oil pump by a second driving electric power greater than the first driving electric power when the second travel mode is selected by the selecting portion.

2. The drive system according to claim 1, wherein the plurality of the drive modes includes a regeneration mode in which a regenerative braking of the second motor-generator is performed, and the predetermined drive mode includes the regeneration mode.

3. The drive system according to claim 1, further comprising
a speed detector configured to detect a rotational speed of the internal combustion engine, wherein
the microprocessor is configured to perform
the controlling including controlling the driving electric power in a state wherein the first travel mode is selected in the predetermined drive mode, so as to drive the second oil pump by the first driving electric power when the rotational speed detected by the speed detector is smaller than or equal to a predetermined rotational speed, while so as to stop the second oil pump when the rotational speed detected by the speed detector is greater than the predetermined rotational speed.

4. The drive system according to claim 3, wherein
the predetermined rotational speed is a first predetermined rotational speed, and
the microprocessor is configured to perform
the controlling including controlling the driving electric power in a state wherein the second travel mode is selected in the predetermined drive mode, so as to drive the second oil pump by the second driving electric power when the rotational speed detected by the speed detector is smaller than or equal to a second predetermined rotational speed, while so as to drive the second oil pump by the first driving electric power when the rotational speed detected by the speed detector is greater than the second predetermined rotational speed.

5. The drive system according to claim 1, wherein
the microprocessor is configured to perform
the controlling including controlling the valve unit and the driving electric power in the HV mode so as to supply the hydraulic oil of the predetermined hydraulic pressure to the mode change mechanism, and so as to stop the second oil pump when the first travel mode is selected, while so as to drive the second oil pump by the first driving electric power when the second travel mode is selected.

6. The drive system according to claim 1, further comprising
a one-way clutch interposed between an output shaft in the first power transmission path and an input shaft in the second power transmission path so that the output shaft and the input shaft integrally rotate in a locked state and the output shaft relatively rotates in relation to the input shaft in an unlocked state, wherein
the mode change mechanism includes:
a planetary gear mechanism having a sun gear connected to the output shaft, a carrier connected to the power division mechanism, and a ring gear;
a brake mechanism configured to brake or non-brake the ring gear by engaging or disengaging; and
a clutch mechanism configured to integrally join or separate the sun gear and the ring gear by engaging or disengaging, and
the microprocessor is configured to perform
the controlling including controlling the valve unit so as to disengage the brake mechanism and disengage the clutch mechanism when the drive mode is switched to the EV mode, and so as to engage one of the brake mechanism and the clutch mechanism and disengage the other of the brake mechanism and the clutch mechanism when the drive mode is switched to the HV mode.

7. The drive system according to claim 6, wherein
the microprocessor is further configured to perform controlling the first motor-generator, and
the microprocessor is configured to perform
the controlling including controlling the valve unit, the driving electric power and the first motor-generator so as to engage the brake mechanism and engage the clutch mechanism, drive the second oil pump by a third driving electric power greater than the second driving electric power, and rotate the internal combustion engine by a driving power of the first motor-generator to start the internal combustion engine when the drive mode is switched from the EV mode to the HV mode, and after the internal combustion engine is started, controlling the valve unit so as to engage one of the brake mechanism and the clutch mechanism and disengage the other of the brake mechanism and the clutch mechanism, and controlling the valve unit and the driving electric power in accordance with the operation of the selecting portion.

8. A drive method of a hybrid vehicle, the hybrid vehicle including: an internal combustion engine; a first motor-generator; a first power transmission path and a second power transmission path connected with each other in series; a power division mechanism connected to the internal combustion engine to divide a power generated by the internal combustion engine to the first motor-generator and the first power transmission path; a second motor-generator connected to the second power transmission path; a mode change mechanism provided in the first power transmission path so as to switch a drive mode to one of a plurality of drive modes including an EV mode in which the hybrid vehicle is driven by a power of the second motor-generator with the internal combustion engine stopped and a HV mode in which the hybrid vehicle is driven by the power of the second motor-generator and the power generated by the internal combustion engine; a hydraulic pressure source including a first oil pump connected to the internal combustion engine to be driven by the internal combustion engine and a second oil pump driven by a driving electric power; a valve unit configured to control a flow of a hydraulic oil supplied from the hydraulic pressure source to the mode change mechanism; and a selecting portion configured to select a first travel mode prioritizing a fuel economy performance or a second travel mode prioritizing a power performance, the mode change mechanism being configured so that the drive mode is switched to the HV mode by the hydraulic oil of a predetermined hydraulic pressure suppled from the hydraulic pressure source, the drive method comprising controlling the valve unit and the driving electric power for the second oil pump, in accordance with an operation of the selecting portion, wherein the controlling includes controlling the valve unit and the driving electric power in a predetermined drive mode including the EV mode and not including the HV mode, so as to stop to supply the hydraulic oil to the mode change mechanism and drive the second oil pump by a first driving electric power when the first travel mode is selected by the selecting portion, while so as to supply the hydraulic oil of a hydraulic pressure lower than the predetermined hydraulic pressure to the mode change mechanism and drive the second oil pump by a second driving electric power greater than the first driving electric power when the second travel mode is selected by the selecting portion.

\* \* \* \* \*